May 18, 1965   P. C. ROBISON   3,183,775
BACKLIT PROJECTION SCREEN

Filed Sept. 10, 1962   2 Sheets-Sheet 2

PAUL C. ROBISON
INVENTOR, DECEASED
BY
ELAINE C. ROBISON,
ADMINISTRATRIX
BY Allen E. Botney
ATTORNEY

3,183,775
BACKLIT PROJECTION SCREEN

Paul C. Robison, deceased, late of Pacific Palisades, Calif., by Elaine C. Robison, administratrix, Pacific Palisades, Calif., assignor to FMA, Inc., El Segundo, Calif., a corporation of California
Filed Sept. 10, 1962, Ser. No. 223,296
2 Claims. (Cl. 88—28.93)

This application is a continuation-in-part of the application entitled "Backlit Projection Screen and Process Therefor," Serial No. 135,286, filed August 31, 1961, now abandoned The present invention relates in general to projection screens for viewing pictures or images and more particularly relates to an improvement of those projection screens onto which the picture or image is projected from the rear.

It will at once be recognized that in using projection screens of the kind mentioned, it is desirable that the projected light be scattered in a forward direction only, that is, toward the viewer, since, by eliminating back scattering of the light, the micro contrast of the image is very greatly improved, which means that a much sharper image is produced.

It is, therefore, an object of the present invention to provide a projection screen that substantially eliminates internal reflections.

It is another object of the present invention to provide a projection screen that significantly improves the micro contrast of pictures presented on it.

The above-stated objects are achieved by means of the present invention, the essence of which is the provision on one face of the screen of a layer of tiny randomly distributed hemispherical lenses that scatter the light in a forward direction only. The surface of the screen having these minute hemispheres or protuberances thereon is the projection surface, the picture or light image being projected onto the viewing surface through the screen from the rear.

In fabricating a projection screen in accordance with the present invention, a mold of some easily machined material, such as Teflon, is used to form a model whose surface contains tiny spheres from which the hemispherical lenses on the screen surface will ultimately evolve. More specificailly, a large number of tiny spheres are mixed with a dilute solution of an epoxy adhesive that will cause them to adhere to one another. This solution or slurry is then poured into the abovesaid mold and the solvent allowed to evaporate. Thereafter, the mold and its contents are baked until the epoxy solidifies. Consequently, when the mold is removed, the model that is left is completely covered on one of its surfaces with these tiny spheres that are partially imbedded in it. Over this model is poured a substance, such as silicone rubber, to provide a final mold and it is into this final mold that the material from which the screen is going to be made is poured. A clear epoxy or a clear plastic material, such as methyl methacrylate, are examples of suitable screen materials that may be used. Finally, when a screen material of the kind mentioned above is suitably cured, we have a screen with a layer of tiny hemispheres on its surface which act as small lenses that scatter light in a forward direction only, thus eliminating unwanted back scattering, reducing internal reflections, and improving the micro contrast.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
FIGURE 1 is an illustration of a female mold.

Referring now to the drawings, a cup-shaped mold 1 made of an easily machined material is shown in FIG. 1. Although the mold is shown cup-shaped, it actually may have any shape, depending upon its ultimate use. Furthermore, the mold is made of any material to which epoxy doesn't stick, Teflon, polyethylene, and silicone rubber being examples of such a material.

Figure 2:
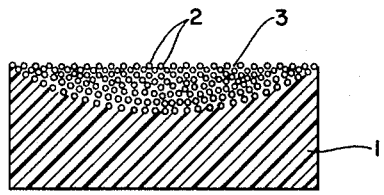
FIGURE 2 is an illustration of the female mold together with the slurry of tiny spheres in the adhesive.

In FIG. 2, mold 1 is filled with a large number of tiny spheres 2 that are mixed with a dilute solution of an epoxy adhesive that will cause these spheres to adhere to one another. This mixture or slurry, designated 3, is poured into the mold, the solvent is allowed to evaporate, and the mold and its contents are then baked until the epoxy solidifies, thereby forming the male mold shown in FIG. 3 which includes the epoxy adhesive and a layer of the tiny spheres randomly distributed on its surface.

Figure 4:
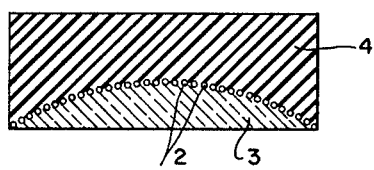
FIGURE 4 is an illustration of the intermediate male mold together with the final mold made from it.
Figure 5:
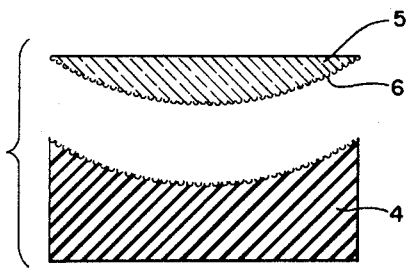
FIGURE 5 is an illustration of the final mold and the projection screen produced with it.

FIG. 4 shows a substance 4, such as silicone rubber or other resilient material, poured over this intermediate male mold to form a final male mold. Assuming substance 4 to be silicone rubber, the silicone rubber mold, shown once again in FIG. 5, is used to cast of a suitable material 5, such as a clear epoxy or a clear plastic material, methyl methacrylate being an example of the latter, a screen with a layer of randomly distributed hemispheres 6 on one of its surfaces, which surface would be the projection surface of the projection screen. By "randomly distributed" is meant that the hemispheres are not neatly arranged in rows and columns or lines, and this is brought about by the fact that some of the hemispheres in the layer are in contact with or are touching each other while others of them are spaced from one another but in close proximity.

With respect to the tiny spheres referred to above, the diameter of these spheres may be from less than one micron to more than thirty microns depending upon the resolution requirements. Thus, for example, a resolution of 160 lines per millimeter requires spheres of about 7 microns in diameter. The spheres themselves may be made of any material but the use of glass spheres or beads are preferred since they are commercially available in this diameter range. In the matter of the solution with which the spheres are mixed, the solution itself is a mixture of epoxy resin and an epoxy solvent. Although any one of several different epoxy solvents may be used, the preferred solvent is methyl ethyl ketone, commonly known as ketone, and it is preferred because it evaporates rapidly without boiling at room temperatures.

Curing is at room temperature and is conducted overnight. However, curing can also be accomplished at above room temperature and, therefore, at reduced curing times. Where the curing is overnight and at room temperature and where a flat-surfaced projection screen is top casted, the ratio of spheres to epoxy, by weight, is 2.3 to 1. With knowledge of the abovesaid ratio and also knowing how many grams of these tiny spheres are needed per square centimeter of projection screen surface, the total sphere weight and the total epoxy weight may then be easily determined.

More specifically, knowing how many grams of these tiny spheres are required per square centimeter of screen surface, the total weight of the spheres that must be used is found by multiplying this figure by the area of the screen surface contemplated. Then, in accordance with the sphere-epoxy ratio specified above, the answer obtained from this multiplication is divided by 2.3 in order to obtain the total weight of the epoxy that must be used.

By way of a concrete example, it will be assumed that 100 square centimeters of projection screen surface area is involved and that 7 micron spheres are to be employed. Consequently, with the assumptions made, 0.026 gram of these 7 micron spheres are needed per square centimeter of screen area. Hence a total of 2.6 grams of these 7 micron spheres are required. Accordingly, by dividing the figure 2.6 by the figure 2.3, the total weight of epoxy required is found to be a little more than one gram. Having set aside the total epoxy needed as determined by these computations, sufficient ketone is then mixed with the epoxy to make its viscosity low enough so as to permit the solution to mix easily with the spheres. In other words, sufficient ketone is added to the epoxy so that it can be poured like water over the spheres to form the desired slurry.

As previously mentioned, the figures used above are for a top cast flat-surface projection screen. However, where the flat-surfaced screen is bottom cast, the figures to be used are somewhat modified. Thus, for bottom casting, the ratio of sphere weight to epoxy weight is 3.5 to 1 rather than the 2.3 to 1 previously specified. Again, the sphere weight per unit screen area is 0.031 gram per square centimeter instead of 0.026 gram per square centimeter indicated earlier. Thus, making the same assumptions as before and following through with the same computations, the total weight of 7 micron spheres required for a flat-surface 100 square centimeter screen is 3.1 grams. The weight of the epoxy, on the other hand, is determined by dividing 3.1 grams by 3.5, which is found to be slightly under 1 gram. Here again, once the proper amounts of spheres and epoxy are obtained, sufficient ketone is then added to the epoxy so that the mixture can be easily poured.

In the examples presented by way of illustration, the figures and ratios used are not critically related to the 7 micron diameter of the spheres. Accordingly, substantially the same figures and ratios would be involved for spheres of somewhat different size. Also, substantially the same figures and ratios would be involved for other than flat-surface screens as, for example, concave or convex surfaced screens, as illustrated in FIG. 5.

Figure 6:
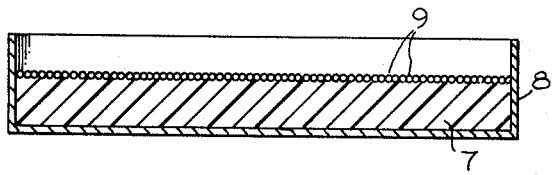
FIGURE 6 illustrates the first steps of another technique that may be used in the manufacture of a projection screen according to the present invention.
Figure 7:
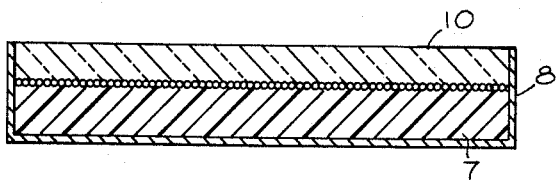
FIGURE 7 illustrates the intermediate steps involved in this second technique and shows the screen material deposited over a layer of uniformally distributed tiny spheres.
Figure 8:
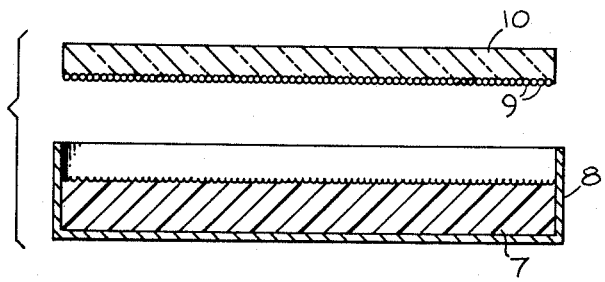
FIGURE 8 illustrates the final steps in the technique mentioned, as a result of which a screen having tiny hemispherical lenses uniformally distributed throughout its face is produced.

A second method for constructing a backlit projection screen having features in accordance with the present invention are shown in FIGS. 6, 7 and 8. In accordance with this second method, a silicone rubber compound of the kind taught in the patent to Charles A. Berriage, entitled "Room Temperature Curing Organopolysiloxane," Patent No 2,843,555 issued July 15, 1958, and a transparent adhesive substance of the kind taught in the patent to John T. Goodwin, Jr., entitled "Organopolysiloxane Compositions Having Pressure-Sensitive Adhesive Properties," Patent No. 2,857,356, issued October 21, 1958, are mixed or poured together in equal amounts, the air that may have been trapped in the combined mixture thereafter being taken out by any one of the existing well-known techniques.

This mixture of materials, designated 7, is then poured into a level tray 8 shown in FIG. 6, the mixture filling the tray almost to its brim. When this is done, the tray and its contents are cured until such time that spheres applied to the surface of the cured mixture sink or become immersed only to a radial distance below the surface of the mixture. In order to determine the point in time during the curing process when this occurs, the mixture in the tray must be tested at frequent intervals. Less curing time is required at the higher curing temperatures to bring the consistency of the mixture to the proper point whereas more curing time is needed at the lower curing temperatures.

When the consistency of the mixture is such that the tiny spheres will become only half immersed, the spheres are then brushed onto the surface of the mixture, the step of brushing them continuing until the entire mixture surface is covered with them. Surplus spheres are then removed or brushed away, leaving the combination shown in FIG. 6 wherein the spheres are designated 9. The curing of the mixture is then continued until it solidifies, after which a layer of epoxy 10 is spread over the layer of spheres as is shown in FIG. 7, the entire combination then being cured some more until the epoxy itself has solidified. When the curing is over, the now solid layer of epoxy is pulled off and when this is done the tiny spheres, which have become cemented to the epoxy, are removed and stay with the epoxy, as is clearly illustrated in FIG. 8. As before, the spheres are randomly distributed.

Figure 3:
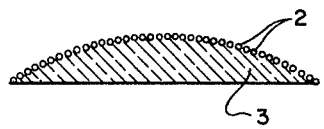
FIGURE 3 is an intermediate male mold of the adhesive material and the tiny spheres imbedded in its surface.

The epoxy-sphere layer is a male mold comparable to the male mold shown in FIG. 3. Accordingly, from it a projection screen can be produced using the steps previously delineated in connection with FIGS. 4 and 5. On the other hand, the mixture remaining in the tray after the spheres have been removed may itself be used as the final mold as was final mold 4 in FIG. 5, the screen, in this case, being manufactured by pouring a screen material of the kinds already mentioned, for example, into the tray and then solidifying it.

It was mentioned several times earlier that the tiny spheres and the hemispherical lenses produced from them are randomly distributed. This is an important feature of the present invention since when they are distributed in a regular pattern, such as rows and lines, a diffraction grating effect is produced that distorts the screen's output image. The random distribution of the spheres and, therefore, the lenses, prevents this diffraction grating effect.

Having thus described the invention, what is claimed is:

1. A projection screen that more effectively projects a picture or light image, said screen comprising: a transparent screen body having an anterior surface upon which the picture is viewed and a posterior surface upon which the light image is projected, said posterior surface being covered with a layer of randomly distributed hemispheres in which some of the hemispheres contact one another and others of them are in spaced proximity to one another, said hemispheres being formed integrally with said screen body and constituting the projection surface of the screen.

2. A projection screen that more effectively projects a picture or light image, said screen comprising: a transparent screen body having an anterior surface upon which the picture is viewed and a posterior surface upon which the light image is projected, said posterior surface being covered with randomly distributed hemispheres formed integrally with said screen body, said hemispheres being contiguous with one another and forming the projection surface of the screen, the diameter of said hemispheres varying in a range extending from less than one micron to thirty microns.

References Cited by the Examiner

UNITED STATES PATENTS

| | | | |
|---|---|---|---|
| 1,176,746 | 3/16 | Federico | 88—28.93 |
| 1,935,471 | 11/33 | Kanolt. | |
| 2,323,754 | 7/43 | Oliver | 88—28.93 X |
| 2,404,454 | 7/46 | Owens. | |

FOREIGN PATENTS

| | | |
|---|---|---|
| 444,011 | 7/12 | France. |
| 959,731 | 10/49 | France. |
| 24,917 | 1911 | Great Britain. |

JULIA E. COINER, *Primary Examiner.*